United States Patent [19]

Huberman et al.

[11] Patent Number: 4,591,980
[45] Date of Patent: May 27, 1986

[54] ADAPTIVE SELF-REPAIRING PROCESSOR ARRAY

[75] Inventors: Bernardo A. Huberman, Palo Alto, Calif.; Tad H. Hogg, Anchorage, Ak.

[73] Assignee: Xerox Corporation, Stamford, Conn.

[21] Appl. No.: 580,919

[22] Filed: Feb. 16, 1984

[51] Int. Cl.[4] ............................................. G06F 15/16
[52] U.S. Cl. ................................................... 364/200
[58] Field of Search ....................... 364/200 MS File; 371/11

[56] References Cited

U.S. PATENT DOCUMENTS

| | | | |
|---|---|---|---|
| 3,106,698 | 10/1963 | Unger | 364/200 |
| 3,287,703 | 11/1966 | Slotnick | 364/200 |
| 4,060,713 | 11/1977 | Golay | 364/416 |
| 4,065,808 | 12/1977 | Schomberg et al. | 364/200 |
| 4,215,401 | 7/1980 | Holsztynski et al. | 364/200 |
| 4,270,169 | 5/1981 | Hunt et al. | 364/200 |
| 4,384,273 | 5/1983 | Ackland et al. | 382/34 |
| 4,395,699 | 7/1983 | Sternberg | 382/41 |
| 4,468,727 | 8/1984 | Carrison et al. | 364/200 |
| 4,507,726 | 3/1985 | Grinberg et al. | 364/200 |

OTHER PUBLICATIONS

Beurle, "Properties of a Mass of Cells Capable of Regenerating Pulses", Royal Society of London Philosophical Trans., vol. 240 (B. 669), p. 8 et seq., (1956).
D. R. Smith et al., "Maintained Activity in Neural Nets", ACM 1969.
G. M. Edelman et al., "Selective Networks Capable of Representative Transformations . . . Memory", Proceedings of National Academy of Science, vol. 79, pp. 2091-2095 (Mar., 1982).
W. H. Kautz, "Cellular Logic-in-Memory Arrays", IEEE Transactions on Computers, pp. 1566-1569, Dec. 1971.
D. H. Lawrie, "Access & Alignment of Data in an Array Processor", IEEE Transactions on Computers, pp. 1145-1155, Dec. 1975.
D. d'Humières & Huberman, "Dynamics of Self-Organization in Complex Adaptive Networks", J. Statistical Physics, vol. 34 (314), pp. 361-379, Feb. 1984.

*Primary Examiner*—Raulfe B. Zache
*Attorney, Agent, or Firm*—W. Douglas Carothers, Jr.

[57] ABSTRACT

An adaptive self-repairing processor array comprising a plurality of identical processing cells arranged in parallel orthogonal columns and rows to form a two dimensional matrix, each of said cells in the array having logic means and a memory for storing a memory state. The first row of the cells in the array forms a parallel input to the array. The last row of said cells in the array forms a parallel output from the array. The cells in the intermediate cells rows between the first and last rows are coupled to at least one cell in a previous cell row. The logic means in each cell computes a new data value based upon the input or inputs from such previous row cells and its present memory state. Each cell is further coupled to at least one cell in the subsequent row of cells. The computed new data value is provided as an output to the coupled cell or cells in the subsequent cell row. Each of the intermediate row cells are coupled to immediately adjacent neighbor cells of the same row to supply the new data value to these neighbor cells and correspondingly receive computed new data values from these same cells. The logic means in each cell compares the new data values received from such neighbor cells with its computed new value and accordingly updates its memory state based upon the results of the comparison.

7 Claims, 10 Drawing Figures

ADAPTIVE SELF-REPAIRING PROCESSOR ARRAY

BACKGROUND OF THE INVENTION

This invention relates to digital parallel processors or processor arrays of the type having a two dimensional matrix of substantially identical interconnected cells adapted to receive signals from other cells in the matrix to sequentially perform transformational operations on a plurality of input signals to produce an output based upon such operations. Thus, the output of any cell under consideration is dependent upon the results of operations performed by neighboring cells, which results are received as inputs by such a cell.

There are many examples of different types of parallel processors or processor arrays in the prior art. Over the years, in particular, dating back into the 1950's, many studies have been made by scientists and researchers concerning the properties of cell arrays and cell masses. Much of this research pertained to studies with intent on understanding and duplicating neuron activity of the human brain, particularly in connection with patterns of learning and recognition. See, for example, the articles of R. L. Beurle, "Properties of a Mass of Cells Capable of Regenerating Pulses", *Royal Society of London Philosophical Transactions, Series B: Biological Sciences*, Vol. 240 (B669) pp. 8–94 (1956); D. R. Smith et al, "Maintained Activity in Neural Nets", ACM, 1969; and G. M. Edelman et al, "Selective Networks Capable of Representative Transformations Limited Generalizations, and Associated Memory", *Proceedings of National Academy of Science*, U.S.A., Vol. 79, p.p. 2091–2095, March, 1982.

From these early studies, many new developments have arisen for parallel processing architecture and design wherein each cell structure in a processor cell array have their individual logic capability for processing data as well as limited memory or storage capacity. These developments were, in part, moved forward by the combination of (1) a need for processing, in a timely manner, a myriad of input data and (2) the advent of large scale integration (LSI) and, later, very large scale integration (VLSI). Examples in the literature of such developments are W. H. Kautz, "Cellular Logic-in-Memory Arrays", *IEEE Transactions on Computers*, pp. 1566–1569, December, 1971; and D. H. Lawrie, "Access & Alignment of Data in An Array Processor", *IEEE Transactions on Computers*, Vol. C-24, No. 12, pp. 1145–1155, December, 1975.

One of the most fundamentally referred to examples of a digital parallel processor in the patent literature is Unger U.S. Pat. No. 3,106,698 comprising a two dimensional matrix of identical processing elements or cells having a logic and storage capability. Each cell is connected to a plurality of neighboring cells and input data or signals may be introduced directly into each cell from an equivalent cell via an input array. Processing in each cell is accomplished under the control of a master control which issues general orders to all of the cells to permit simultaneous processing of the data in each cell and transfer information between cells through multiplexer links. A series of transformations are performed on the input data by the cells to arrive at an output matrix. Other examples of such parallel processor arrays under the control of a master control, such as a central processor or controller, are U.S. Pat. Nos. 4,065,808; 4,215,401; 4,270,169 and 4,395,699.

Some of the best known applications for parallel processors or processor arrays is automatic recognition, analization, digitization and/or classification of patterns, and the process of pictorial information or alphanumeric character type information. An example of such a processor is disclosed in U.S. Pat. No. 4,060,713 relating to analysis of images by comparison of values of image elements with neighboring image elements in a two dimensional processing field. U.S. Pat. No. 4,384,273 discloses an orthogonal array of interconnected array cells with time warping signal recognition for matching signal patterns. Another patent is above mentioned U.S. Pat. No. 4,395,699 relating to an image analyzer system having a processor array for analyzing groups of neighborhood pixel values and selectively transforming the pixel values as a result of such group analysis.

Today, parallel computation holds promises in many fields, ranging from numerical methods and robotics, to cognitive processes such as vision and speech understanding. Recent advances in VLSI technology have made it possible to construct concurrent processor arrays based on a regular array of locally connected elements or cells. Besides their useful applications, such processor arrays have the potential of exhibiting behavior characterized by self-organization, learning, and recognition.

Because of the large number of array cells and associated control means, these arrays are relatively complex in architecture and design. While prior processor arrays have aimed at simplifying these processors, it is a difficult task, particularly where accuracy is a paramount parameter and constraint desired in the processing operation carried out by the array cells.

We have discovered that a processor array may be designed to have a learning capability sufficient for utilization in the above-mentioned applications while not being constrained to a high degree of accuracy, i.e., providing an output immune to errors that may occur in the one or several individual cells of the array. We refer to this immunity as "self-repairing".

SUMMARY OF THE INVENTION

According to this invention, an adaptive self-repairing processor array is designed to have adaptive behavior in parallel array cells which can be implemented with the current VLSI technology. Features such as local connection, few wires and a regular lattice structure, make them ideally suited for implementation on single VLSI chips. Moreover, their high degree of concurrency and programmability provide an effective method for useful array properties, which include learning, pattern recognition and associative content addressable memory. The novel adaptive processor array of this invention exhibits a self-repairing mechanism which is based on the existence of stable attractors in the overall array dynamical behavior, which implies a conceptual departure from the usual multiplexing thinking and associated majority rule schemes.

The adaptive self-repairing processor array of this invention comprises a plurality of identical processing cells arranged in parallel orthogonal columns and rows to form a two dimensional matrix wherein the first row of cells in the array forms a parallel signal input to the array. Each cell in the first row receives an input signal from a signal source. Subsequent rows of the array cells are coupled to immediate neighborhood cells in either or both orthogonal and diagonal directions relative to the parallel orthogonal rows and columns of the array matrix. Logic means in each of cells, therefore, will receive one or more inputs from one or more orthogonally or diagonally connected cells in the previous cell row and from adjacent cells in the same row. The logic means provides computing, comparison anaysis and updating of the input values received with the data value in the memory of a cell to provide a new memory data value and a new output data value. The new output data value is provided as an output to orthogonally and/or diagonally connected cells in a subsequent cell row and to adjacent cells in the same row for the purposes of comparison analysis.

In particular practice, the connected inputs to a cell under consideration, received from a previous row of cells, are employed in a computation to provide a new cell value based upon established algorithms or rules. This computation includes the employment of the present memory state of the cell. The new value obtained is compared with the other new values obtained by the two adjacent neighbor cells of the same row to determine if the new value of the cell under consideration is no different, higher or lower than either of the new values of either of the adjacent row cells. If the value compares to be the highest, the value of the memory state of the cell under consideration is increased by one. If the value compares to be the lowest, the value of the memory state of the cell under consideration is decreased by one. Otherwise, the memory state remains unchanged, i.e., if the value is neither higher or lower, no memory state change is made. This processing continues (1) with the computed new data values set to remain in a prescribed range of saturation limits and (2) as long as there are input signals present and until the last of such signals propagates to the last row of the cells in the array.

Other objects and attainments together with a fuller understanding of the invention will become apparent and appreciated by referring to the following description and claims taken in conjunction with the accompanying drawings.

DESCRIPTION OF PREFERRED EMBODIMENTS

Figure 1:
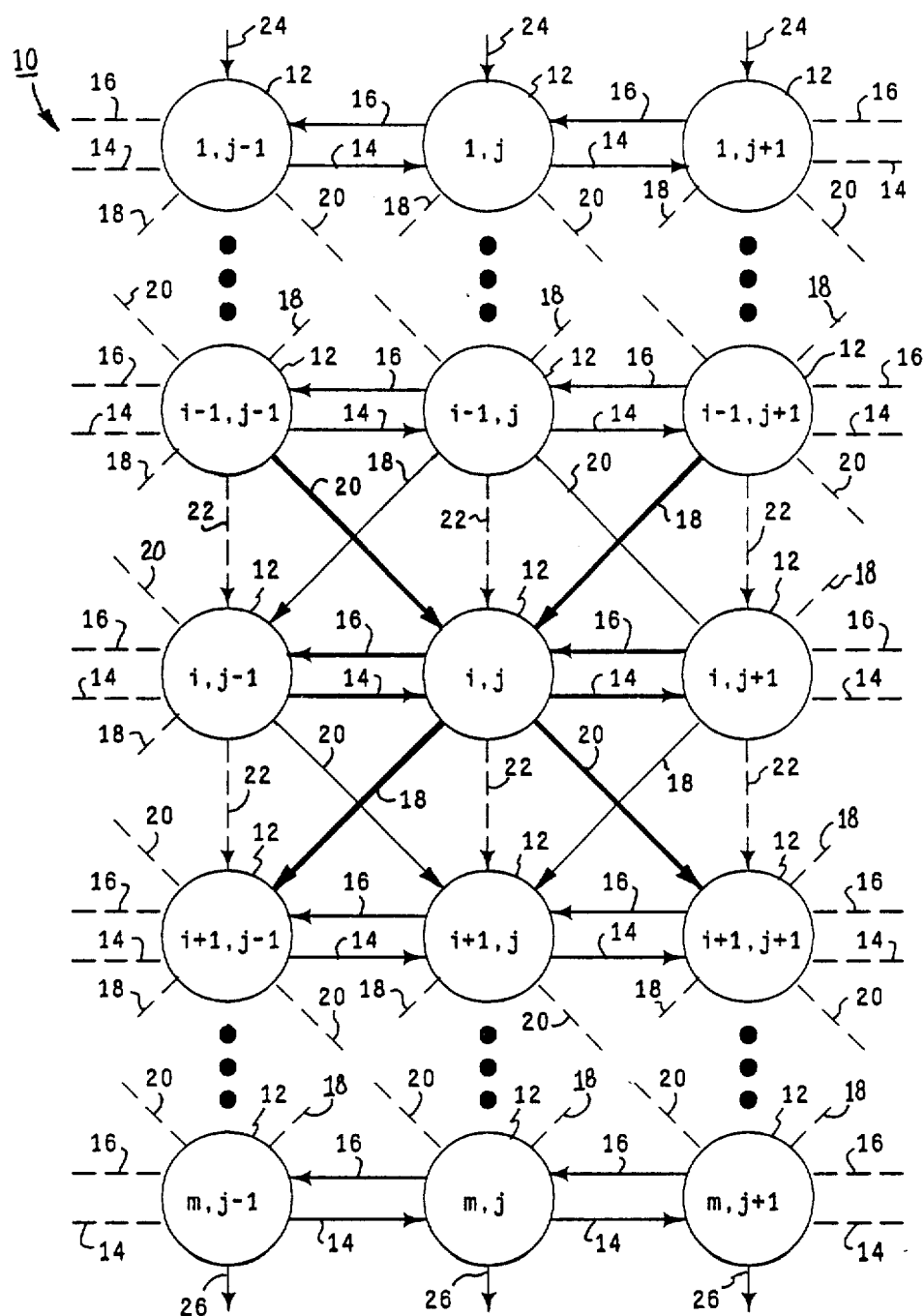
FIG. 1 is an example of interconnections between cells in an adaptive processor array according to the present invention.

Reference is made to FIG. 1 illustrating an example of the adaptive processor array 10 of the present invention. The array 10 comprises a plurality of interconnected identical processing cells 12 arranged in parallel orthogonal rows, m, and columns, n. In the simple representation shown, adjacent cells in a row are connected to each other and cells from a previous row are connected to diagonally positioned cells in a subsequent row.

FIG. 1 represents only a portion of array 10. The illustration relates to a unit cell i,j of the array and its relationship to immediately adjacent neighborhood cells in immediately adjacent columns and rows of the array. Array 10 could extended by many more columns and rows, as indicated in FIG. 1 horizontal dotted lines and the vertical rows of dots therein, to form large matrices, for example, 20 cells by 32 cells, i.e., 20 rows and 32 columns totaling 640 cells. The array configuration may be square or rectangular. The size and shape of the array depends upon the number of inputs needed and the type of application that is desired.

The central cell 12 of array 10 is designated cell ij in row i and column j. Thus, the top row is row i−1 followed by row i and thence row i+2. By the same token, the left column of the array 10 is column j−1, followed by column j and thence column j+1.

Cell 12 at cell position i−1,j−1 in FIG. 1 is connected by line 14 to adjacent row cell i−1,j and this latter cell is connected by line 16 to cell i−1,j−1. This same type of cross connection arrangement is also true between the row cells of all rows i−1,i and i+1 as indicated by the same numerically identified lines 14 and 16.

As above indicated, cells 12 of a previous row are connected to cells 12 of a subsequent row by means of diagonal lines 18 and 20. Thus, for example, cell i,j in row i is diagonally connected to cell i+1,j−1 in the subsequent row i+1 by line 18 and to cell i+1,j+1 of subsequent row i+1. These lines 18 and 20 represent output lines from cell i,j and output line 18 is one of two inputs to cell i+1,j−1 and output line 20 is the other of two inputs to cell i+1,j+1. By the same token, diagonal line 20 from cell i−1,j−1 in previous row i−1 is one input to cell i,j in row i and diagonal line 18 from cell i−1,j+1 of row i−1 is the other input to cell i,j in row i.

It should be noted at this point that the configuration of cell connection shown in FIG. 1 is not the only possible configuration within the basic concept of this invention. For example, the diagonally connected lines 18 and 20 may be not employed and connections could be with a column cell in a previous row and in a subsequent row as illustrated by dotted lines 22. A further configuration would be the inclusion of lines 22 in the embodiment as shown in FIG. 1. Cell row connections are particularly important in the particular application of the rules and algorithms of the present invention in connection with image enhancement, image recognition, edge recognition, etc.

Figure 4:
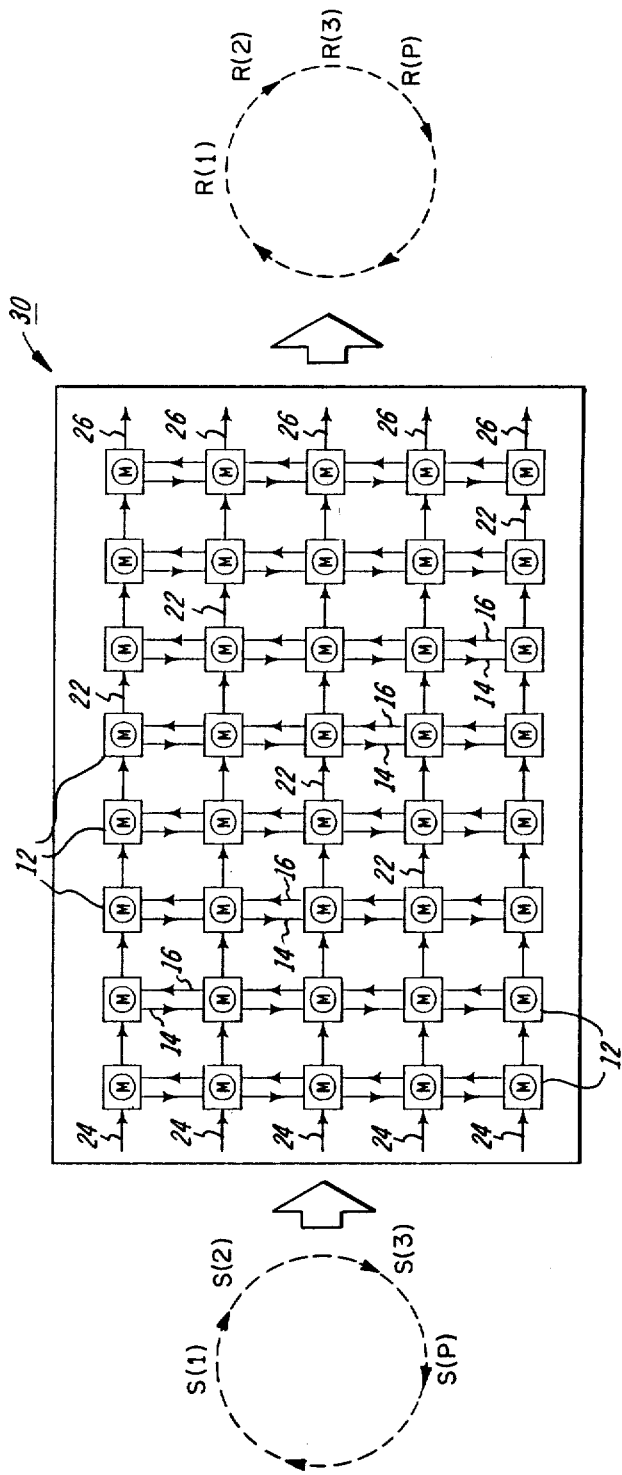
FIG. 4 is another example of interconnections between cells in an adaptive processor array according to the present invention for the purpose of demonstrating the stroboscopic sampling of the adaptive processor array of this invention.

As an example of the above, FIG. 4 illustrates a 5 cell by and 8 cell array 30 illustrating single integer inputs and outputs between aligned column cells in adjacent rows of the array connected by lines 22.

In the partial representation of FIG. 1, top row represents, for the sake of simplicity in illustration and explanation, the input row to the array 12 is via input lines 24 to each of the cells of the first row or row 1 while the last or output row of the array is via output lines 26 from each of the cells or row m. Of course, in actual practice, there would be additional rows m of cells between these termination rows and rows i−1, i and i+1. The side edges or the first and last columns, respectively 1 and n, of the array are not employed in the processing operation of the array and form side boundaries for the array between the input row 1 and the output row m.

Figure 2A:
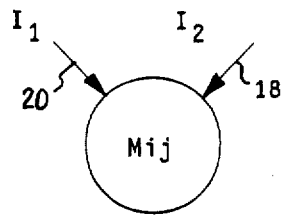
FIGS. 2A, 2B and 2C are pictorial illustrations of the three principal functions performed by the cells in the array of FIG. 1, which functions are, respectively, compute, compare and update, and output in accordance with the algorithms and rules used in the processing operation of the array.

Each cell 12 receives data values from the inputs of its connected neighboring cell in the same row and from the preceding row. The inputs on lines 18 and 20 from the preceding row represent two integer inputs $I_1$ and $I_2$, as shown in FIG. 2A. In addition to data values received through these connections, each cell, which is itself a processor, has an adjustable internal memory state, M, which allows a cell to adapt to its local environment, i.e., its resultant data value is either changed or not changed dependent upon the data values received as inputs from neighboring cells.

Thus, for a particular implementation of array 10 in FIG. 1 with m rows and n columns, each cell 12 is provided with two integer inputs $I_1$ and $I_2$ and a single integer output, O. All of the data values to travel through the array are further constrained to lie between two limits represented by integers $S_{min}$ and $S_{max}$ with $S_{min} < S_{max}$ and wherein S is the saturation limit integer, maximum and minimum. This constraint eliminates the possibility of data overflow and, more importantly, provides a high degree of reliability to the array, as will be discussed in further detail below. Considered the symmetric case in which $S_{min} = -S_{max}$ and chose $S_{max} = 15$. The internal state of each cell is represented by a single small integer. The local computation rules or algorithms for each cell enhance differences in the data values, with a saturation process maintaining the values within the specified range.

Figure 2B:
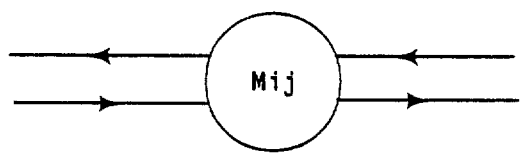
Figure 2C:
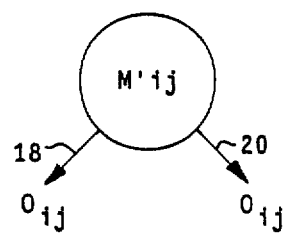

Specifically, let $M_{ij}(k)$ be the memory value between a fixed saturation range, $M_{min}$ and $M_{max}$ contained in a cell located in the $i^{th}$ row and $j^{th}$ column after the $k^{th}$ time step. Let $I^{(1)}_{ij}(k)$ and $I^{(2)}_{ij}(k)$ be the input values to this element and $O_{ij}(k)$ be the output. FIG. 2 is useful in the explanation of the steps by which new data values and memory values are computed. FIG. 2A represents the computation step for data value $O_{ij}(k)$ based upon values $I_1$ and $I_2$ received on lines 18 and 20 of cell ij from diagonally connected cells from the previous row i−1. FIG. 2B illustrates the comparison step wherein the computed values are forwarded to neighbor cells of the same row i for comparison with the memory data value of each of its adjacent neighbor cells i,j−1 and i,j+1, and then the memory value, $M_{ij}$, is updated according to the comparison result with the computed data values of neighbor cells. FIG. 2C illustrates the updated memory value, $M'_{ij}$ and the new data value, $O_{ij}$, which is provided as a single integer output on lines 18 and 20. This processing is further illustrated by the flow diagram of FIG. 4.

A general explanation will now be made of cell processing before detail description of the algorithms and rules.

First, consider that the four saturation limits for both $S_{min}$ and $S_{max}$; $M_{min}$ and $M_{max}$ have been set to predetermined values. Referring to FIG. 4, input signals, each representative of particular data values, are supplied to the first row of array cells 1 from a data source via input lines 24.

Next, according to the compute step of FIG. 2A, an output is computed in a cell according to the input value differences between the data values $I_1$ and $I_2$ on lines 18 and 20 obtained from cells in the previous row. Then, this computed value is multiplied with the present memory value to produce a new data value, $O_{ij}$. According to FIG. 2B, this new value is then compared with the computed new value obtained in immediately adjacent row cells. This is accomplished through the horizontal connections with adjacent cells in the same row to thereafter adjust the internal state of the cell memory, $M_{ij}$, based on a neighbor's output. If the comparison indicates no change or "NO", then the present data value in the cell is maintained and remains unchanged. However, if the value compares to be highest or lowest, then the present accumulated value in the cell memory is updated to the new value, either higher or lower. The internal memory value or state of the cell memory, $M_{ij}$, is accordingly modified to $M'_{ij}$ and the new data value, $O_{ij}$, is dispatched as an output signal to one or more neighborhood array cells, which, in the case of FIG. 1, are output lines 18 and 20 from each cell 12.

Having completed this output, a full cycle of cell processing in a time step, k has been achieved. If the last series of inputs to the cell array have not been received, this cycle is repeated until the last row of input signals have propagated to the last row m of the array, at which point the processing is complete and the data values within the above mentioned saturation limits is presented as a line output via output lines 26, the parallel output signal of the array 12.

Thus, at each time step, k, the new output of a cell 12 is computed by the equation $$O_{ij}(k+1) = \max[S_{min}, \min[S_{max}, M_{ij}(k) \cdot (I^{(1)}_{ij}(k) - I^{(2)}_{ij}(k))]] \tag{1}$$

which, except for the saturation $S_{min}$ or $S_{max}$, just multiplies the difference between the inputs $I_1$ and $I_2$ by the value stored in the cell memory, $M_{ij}$. Note that the output is a nonlinear function of the inputs because of the saturation limits.

The connections between adjacent cells in the same row is determined by specifying which output is connected to each input. This is defined by the relations:

$$I^{(1)}_{ij}(k) = O_{i-1,j-1}(k) \tag{2a}$$

$$I^{(2)}_{ij}(k) = O_{i-1,j+1}(k) \tag{2b}$$

for $1 \leq i \leq m$ and $1 \leq j \leq n$ where m and n are predetermined row and column values. These connections cause the data to flow through the array at a rate of one row per time step, k. The external input signal to the array at step k is denoted by S(k), and R(k) is the resulting output signal. The boundaries of the array are specified by $$O_{0j}(k) = S_j(k) \tag{3a}$$

$$O_{m,j}(k) = R_j(k) \tag{3b}$$

and $$O_{i,0}(k) = O_{i,n+1}(k) = 0 \tag{3c}$$

for the top, bottom and side edges respectively.

In addition to this compute process, which basically involves the flow of data through the array, there is an adaptation mechanism which modifies the memory values $M_{ij}$. Specifically, the output of the cell i,j is compared to the outputs of its neighbors to the left and right, as shown in FIGS. 2(B) and (C). If the output of cell i,j is greater or smaller than the other two, the value of $M_{ij}$ is respectively increased or decreased by one, subject to the restriction that the value remain in a fixed range [$M_{min}$, $M_{max}$]. Otherwise $M_{ij}$ is not changed. For example, the range values may be $M_{min}=1$ and $M_{max}=4$. This provides, for example, local adaptation to edges by adjusting the memory value at points where the data is changing rapidly.

As previously noted, this comparison process requires horizontal connections with neighbor row cells within each row. Thus, by separating the adaptive process from the flow of data through array, the adapted array can be analyzed by sending a series of parallel input signals through the array without changing the memory values.

The general behavior of such a processor array may be very complicated. However, the number of independent configurations that must be considered is greatly reduced by studying the output from the last row, and considering as identical all states of the array that produce the same output. To provide a quantitative measure of "unsupervised learning" in the array, a stroboscopic technique is employed, which is diagrammatically illustrated in FIG. 4. By presenting a periodic string of inputs and computing the distance (differences) between corresponding sets of sampled outputs, one is able to study dynamical changes in the array while it is adapting to the sequence of input signals per time steps, k. The various inputs are pipelined through the array without the necessity of direct access to the internal memory state, M, of the array cells.

In the adaptive mode of operation, i.e. when the internal memory state of each cell 12 is modified based on the data values it receives from its neighbor cells, the periodic sampling described above rapidly converges to a particular set of patterns. A quantitative measure of this convergence is given by the maximum distance (differences) between corresponding outputs in successive periods of the input sequence. Since a particular signal requires m time steps to reach the output, the signal vector entering the array at step k, S(k), will produce a result at step m+k, R(m+k). Let P be the input period so that S(k+P)=S(k) for all k. The output distance for each period is computed according to $$d(t) = \max_{\{K\}} \| R(m + k + P) - \underline{R}(m + k) \| \tag{4}$$

where k ranges over the set $\{tP+1, tP+2, \ldots, (t+1)P\}$, i.e. the times at which the $t^{th}$ period of the input signal enters the array. Convergence to a fixed point, which is signaled by d(t)=0, implies that the outputs are the same for successive input periods.

Figure 5:
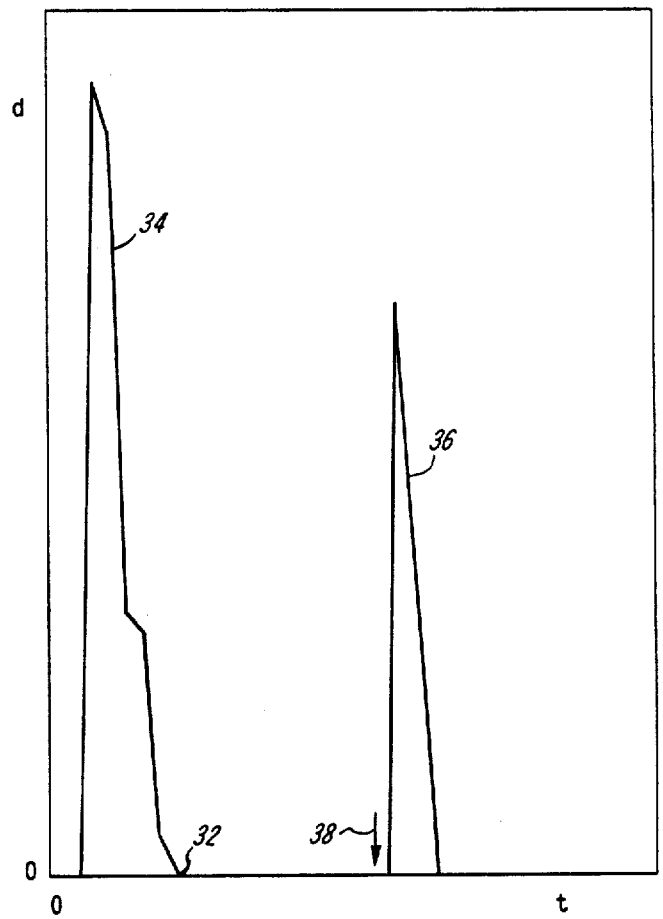
FIG. 5 is a graphic representation of the distance (differences) between successive sets of outputs of an array of the present invention as a function of time to illustrate the self-repair aspect of the instant invention.

FIG. 5 shows the results of an experiment performed on a representative array consisting of 64 cells arranged in a square lattice which was subjected to a periodic, pipelined input consisting of 4 patterns (P=4) chosen at random. The saturation values were chosen to be $S_{max} = -S_{min} = 15$. As shown in FIG. 5, curve 34 represents the changing state of the array and stabilizes at point 32 in a relatively short time. To be noted is that there are about 5 periods up to the position of arrow 38. In the adapted regime, the stroboscopically sampled state of the array consists of a complicated configuration of memory values, $M_{ij}$, which are illustrated in the upper insert in FIG. 4 entitled "Array Before Upset".

In both inserts of FIG. 4, the upper insert: "Array Before Upset" and the lower insert: "Upset Array", the asterisks (*) represent the value of 4 and the dots (.) represent the value of 1. The other values, 2 and 3, are shown at the points in the array as indicated. The use of these symbols is solely for the purpose of not cluttering the insert representations so that the inserts are easier to follow and comprehend.

Figure 6:
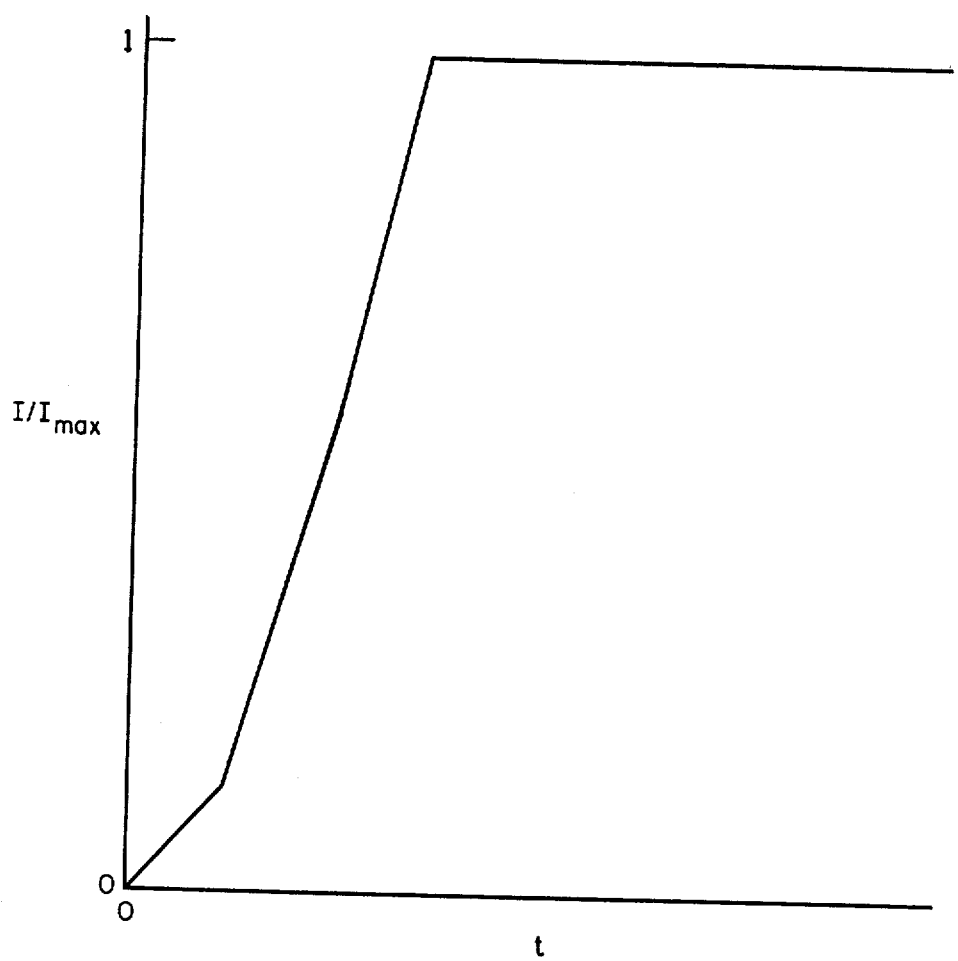
FIG. 6 is a graphic representation of the percent of data signal that is saturated as a function of time.

The fixed points of data values after point 32 possess the strong property of being attractive, i.e. departures from them tend to relax back to originally obtained values as in dissipative dynamical systems. This is caused by the saturation used in the computation rules of equations (1) and (2), which prevents unbounded growth of errors through processing by the array. This process is illustrated by plotting the fraction of data values that are saturated, i.e. equal to either $S_{min}$ or $S_{max}$, as a particular input moves through each row of the array. This is illustrated in FIG. 6 wherein the percents of the input signals, $I/I_{max}$, that are saturated is plotted over time. It should be noted that this does not imply that the internal memory values are saturated. FIG. 6 shows this fraction for the square array with 64 cells. Note that the data reaches saturation more rapidly as the cells in the array adapt to values based upon the parallel input signal or set of parallel input signals.

The existence of stable attractors for these computing structures provides a novel mechanism of self-repair during the adaptation process of the array following the algorithms and rules provided in the previously mentioned equations. The dynamics of the array are such that it causes small fluctuations in either new data values or memory values to relax toward the attractive fixed points. It should pointed out that this general method of self-repair is very different from the standard techniques used for reliable computing. The latter are based on multiplexing schemes with majority rules and require an enormous amount of hardware per operation. The techniques herein disclosed, however, use instead the stable collective modes of the adaptive processor array.

Errors can occur during the adaptive process either while the array is changing or after it has converged. Such errors may be introduced by randomly modifying some of the memory data values, $M_{ij}$, and then allowing the array processing to proceed as before or by permanently freezing the state of some of the cells as well as their outputs.

The changed values for the example of FIG. 5 are shown in the bottom insert, "Upset Array" wherein the circled numerical values represent changes to the memory values, $M_{ij}$, as compared with their previous values, for the same cell locations illustrated in the upper insert. These upset values are inserted in the respectively designated cells at the time indicated by arrow 38 in FIG.

5. Any changes produced at the output are recorded and are a measure of the behavior of the array. It is to be noted that an error that occurs inside the array but is repaired before reaching the output row m of cells will never be noticed. Even for fairly small arrays, it has been found that the adaptive self-repairing process is very insensitive to such changes, with rapid convergence back to the overall previous memory state. This is illustrated in FIG. 5 by the curve 36, which shows the distance (differences), d, function verses time, t, as the array adapts to its original values after the insertion of the five upset values at point 38. By distance, we mean the differences in values between the respective outputs of "Array Before Upset" and the respective outputs after "Upset Array" based upon the same parallel input signal or set (series) of parallel input signals. After the processing converged, the five cell memory values, which were then modified, caused a change at the output which was randomly corrected. In other instances, the error recovery has been found to be so rapid that the output row m of cells never changed. Typically, a change in 20% of the cell memory values may be "healed" via processing operation by the array using the algorithms and rules herein defined.

These attractive fixed points produce recognition processes which, unlike those in digital electronic filters, are nonlinear due to saturation in the local computation rules or algorithms. By fixing the values of the memory states of the cells and then sending a series of inputs through the array in any given order, one can determine which learned inputs produced different outputs. These processes map many different input patterns into each output and, in general, the output of the array is insensitive to small variations in any or some of the inputs. Thus, small distortions, as measured by their distance, of the learned inputs still produce the same outputs. Said another way, the processing operation is immune to small changes in input values or memory state values during processing whereby the same desired outputs will still be produced. Also, by using each output as an address in a data base, for example, the array can be made into a flexible content addressable memory.

The motion of the data values deep within the adaptive processor array in the recognition mode may be analyzed in a recursive fashion. Since, in this particular case, the data values become saturated, and the saturation values are symmetric, there are three possible values, namely 0, $S_{max}$ and $-S_{max}$ which can be considered as the closed set $\{1, 0, -1\}$.

The dynamics can then be studied by assuming that as data values move down from one row of cells to the next, the distribution of ones and zeros within a row is random. Within this "random phase approximation", suppose that $+1$ and $-1$ each appear in a given row with probability p, and 0 appears with probability q so that $2p+p=1$. Consider a cell in row $i+2$ and its parents in rows $i+1$ and i. The three parents in row i produce outputs $O_1$, $O_2$ and $O_3$, respectively. These outputs are fed into two cells in row $i+1$ which in turn produce outputs $O'_1$ and $O'_2$. Next, the output $O''$ of the element in row $i+2$ is computed. In this case there are $3^3 = 27$ possible combinations of the three outputs of row i. Since the data values are assumed to be independent of each other, the probability that the final output $O''$ will be zero or $\pm 1$ can be computed. The probabilities of obtaining 0 or $\pm 1$ in row $i+2$, q' and p', given the probabilities in row i, are then determined by the following recursion relations:

$$q' = (1 - q - q^2 + 5q^3)/4$$

$$p' = (1 - q')/2$$

In a deep array, the asymptotic behavior is determined by the stable fixed points of these recursion relations, which are $q = 1/5$ and $p = 2/5$. Thus zeros will be comparatively rare and most of the output will consist of $\pm 1$. The testing of this behavior by sending many input signals through various sizes of arrays have resulted in the experience that zeros seldom appear in the saturated outputs of the array. A quantitative comparison will require the consideration of correlations produced by additional rows which tend to make the appearance of zeros deep in the matrix of the array even less likely.

The processing arrays described above consist of identical computing cells with short local connections arranged in an orthogonal lattice. Also, input/output is performed only at the edges, thus minimizing the length of connection leads. As such, they can be readily implemented in hardware. Such an implementation could be very fast since computation is done by all cells in a concurrent manner. However, the primary limitation will usually be set by the rate at which input signals can be delivered to the array and outputs removed from the array.

Figure 3:
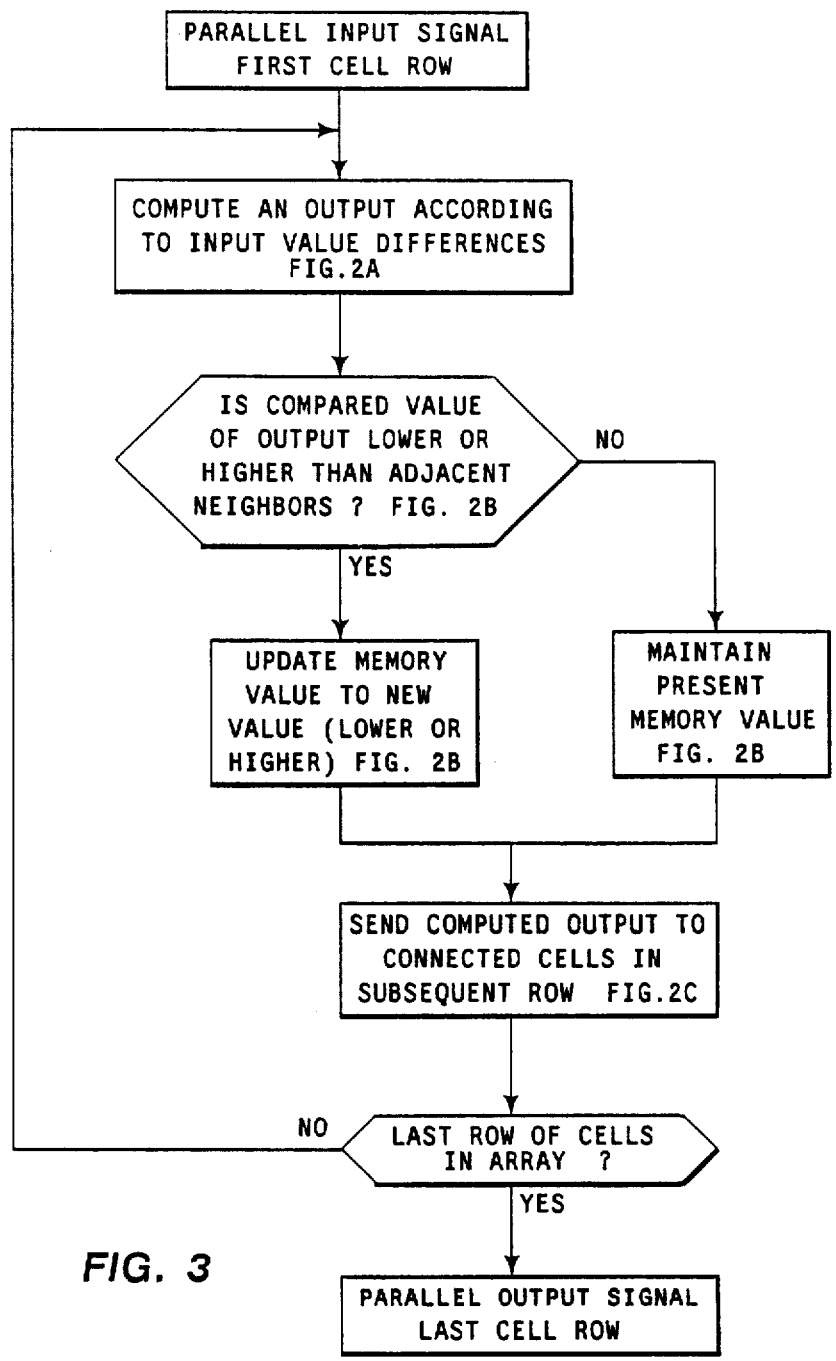
FIG. 3 is a logic flow diagram for the rules and algorithms used in the processing operation of the array.
Figure 7:
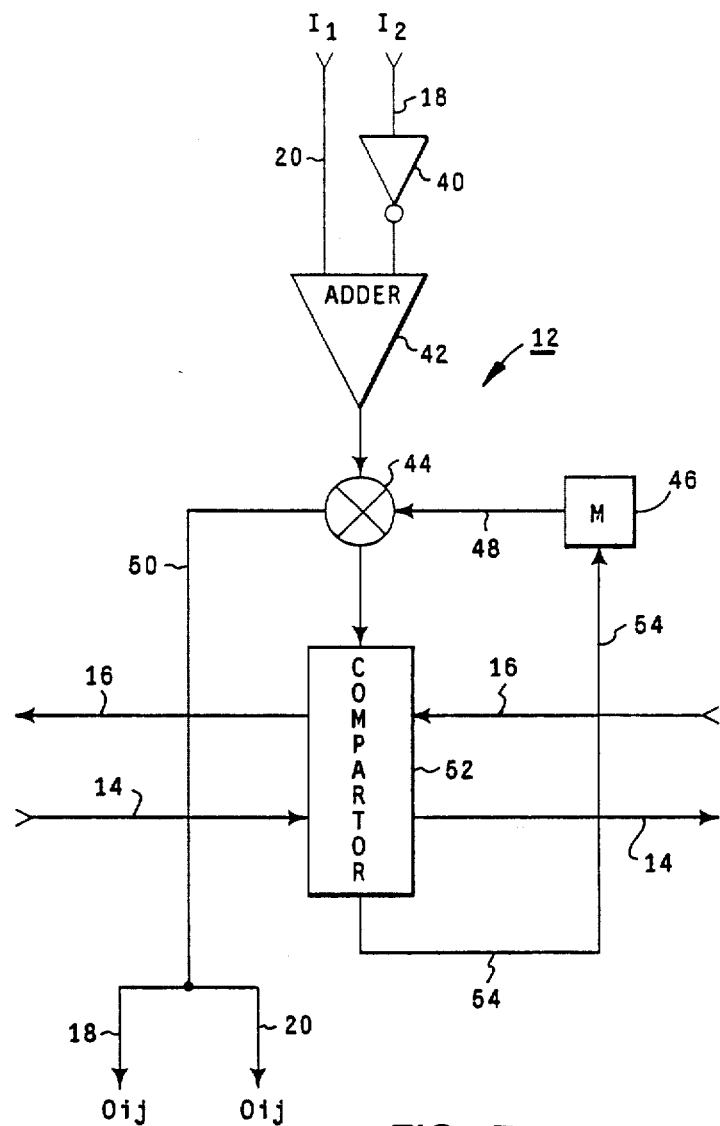
FIG. 7 is a circuit representation that may be employed for the array cells of the present invention.

While many conventional circuit arrangements may be devised to perform the functions of FIGS. 2 and 3, FIG. 7 illustrates one possible arrangement for the structure of cell 12. Inputs $I_1$ and $I_2$ from diagonally connected cells in the previous row of the array are supplied to adder 42 with input $I_2$ being inverted via inverter 40. Adder 42 provides an output representative of the difference between inputs $I_1$ and $I_2$ as an input to the multiplier 44. Beside the input from adder 42, multiplier 44 also has an input from the cell internal memory 46 for multiplying the data value present in memory M with the value received from adder 42. The outputs from multiplier 44 on lines 48 and 50 represent the result of the compute step of FIG. 2A, i.e., the result of equation (1) within the limits of $S_{max}$ and $S_{min}$. Output, $O_{ij}$, on line 50 is supplied on lines 18 and 20 to diagonally connected cells in the next row of the array. This output is also supplied to comparator 52 via line 48. Comparator 52 first compares the value represented by the signal on line 48 with the new data values represented by each of the signals on input line 14 from the row cell to the left of the cell under consideration and on input line 16 from the row cell to the right of the cell under consideration.

As indicated in connection with the description of FIG. 3, if the value compared relative to either one of the inputs is the same, there is no change and no update value. However, if the new value on line 48 compares to be either higher or lower than both of the representative values on input lines 14 and 16, within the saturation limits $M_{max}$ and $M_{min}$ of memory 46, then the value of memory 46 will be updated by an increase of one (if the data value on line 48 is greater than either one of the values on input lines 14 and 16) or will be updated by a decrease of one (if the data value signal on line 48 is less than either one of the values on input lines 14 and 16). The updated memory value at memory 46 is now ready for the next cycle of operation as an input to multiplier 44.

The output lines 14 and 16 from comparator 52 provide for the transfer of the new data value signal on line 48 to be supplied respectively to the row cell to the right of and to the left of the cell under consideration.

Figure 8:
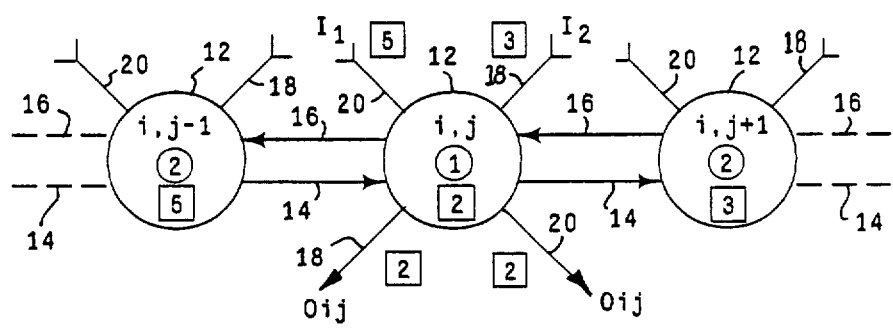
FIG. 8 is an illustration of the processing operation of the array under the rules and algorithms expressed in this invention.

FIG. 8 represents a specific example illustrating the processing operation in accordance with the algorithms and rules defined herein. Assume for the purpose of the example that the cell under consideration is cell ij and its row cells i,j−1 and i,j+1. Assume further that the present memory values for cells i,j−1; ij and i,j+1 are respectively 2, 1 and 2. Assume further that updated values received from the previous row as inputs $I_1$ and $I_2$ are respectively 5 and 3. $S_{max}$ is 15 and $S_{min}$ is −15. $M_{max}$ is 5 and $M_{min}$ is 1.

During the compute step, the difference of the values $I_1$ and $I_2$ is taken and multiplied via multiplier 44 by the value in memory M of cell ij. This results in $$1 \cdot (5-3) = 2$$

The new value 2 is then supplied as input to cell i,j−1 via output line 16 and to cell i, j+1 via output line 14 for comparison with the new value obtained at those cells. Also, the new value 2 at cell ij is placed as an output, $O_{ij}$, on its output lines 18 and 20 to connected cells in the next row of array cells.

Now, assume that the new value in cell i,j−1 was 5 and the new value in cell i,j+1 was 3, both of these values being calculated based upon inputs $I_1$ and $I_2$ received from connected cells in the previous row of the cell array as multiplied with their accumulated memory value. The new value of cell ij of 2 is then compared with the new value 5 of cell i,j−1 and the new value 3 of cell i,j+1. In both cases, the value of $O_{ij}=2$ proves to be lower. To be noted is that if one of the compared values with a neighbor row cell was higher and the other lower, the resultant comparison with both would result in no change to the memory state of cell i,j.

Since the comparison, however, proves to be that cell ij has the lowest value, its memory value is to be lowered by 1. However, the memory of cell ij is already at the lower limit value of $M_{min}=1$. Therefore, the memory value of cell ij will remain at 1.

While the invention has been described in conjunction with specific embodiments, it is evident that many alternatives, modifications and variations will be apparent to those skilled in the art in light of the foregoing description. Accordingly, it is intended to embrace all such alternatives, modifications, and variations as fall within the spirit and scope of the appended claims.

What is claimed is:

1. An adaptive self-repairing processor array comprising a plurality of identical processing cells arranged in parallel orthogonal columns and rows to form a two dimensional matrix, each of said cells in said array having logic means and a memory for storing a memory state, the first row of said cells in the array forming a parallel input to the array, the last row of said cells in the array forming a parallel output from the array, the cells in the intermediate cell rows between said first and last rows coupled to at least one cell in a previous cell row, said logic means in each cell to compute a new data value based upon said input and its present memory state, said each cell coupled to at least one cell in a subsequent cell row, said new data value provided as an output to said subsequent cell row, each of said intermediate row cells coupled to immediately adjacent neighbor cells of the same row to supply said new data value to said neighbor cells and correspondingly receive new data values from said neighbor cells, said logic means in each cell to compare the new data values received from said neighbor cells with its computed new data value and accordingly update its memory state based upon the results of said comparison.

2. The adaptive self-repairing processor array of claim 1 wherein the updating of said memory state is accomplished only within a set range of values.

3. The adaptive self-repairing processor array of claim 1 wherein the values provided as output from said cells are accomplished only within a set range of values.

4. An adaptive self-repairing processor processor array comprising a plurality of identical processing cells arranged in parallel orthogonal columns and rows to form a two dimensional matrix, the first row of said cells in the array forming a parallel input to the array, each cell of said first row adapted to receive an input signal from a signal source, subsequent rows of said cells coupled to immediate neighborhood cells in both orthogonal and diagonal directions relative to said parallel orthogonal rows and columns, means in each of said cells to receive an input signal from said coupled cells in a previous cell row and from coupled neighbor cells in the same cell row, means in each of said cells to transmit an output signal to coupled cells in a subsequent cell row and to coupled adjacent cells in the same cell row, memory means in each cell to store a data value therein, logic means to perform simultaneous iterative calculations in the cells of each row based upon said input signals wherein the cells of each cell row calculate new values based upon said input signals and its present memory value and compare the new value with new values attained by said coupled adjacent cells, means to update the memory value in each of said cells to store said new value if the new value is different from the present memory value, the last row of said cells in the array forming a parallel output from the array, said parallel output representative of a corresponding enhancement of the original signal source parallel input of said array regardless of any inappropriate changes to the instantaneous value of one or more of said array cells due to an abnormality of malfunction in any such affected array cells, 5. The adaptive self-repairing processor array of claim 4 wherein said cells further include means in each of said cells to inhibit a change in said present memory value in a cell when such value has reached a predetermined limit.

6. A method of parallel processing of a plurality of input signals from a source, representative of a wave of data, to provide an enhancement to the values of said data wave based upon the difference in signal values between adjacent input signals of the data wave comprising the steps of extending said input signals in parallel fashion through an orthogonal array of processor cells wherein cell rows are connected to some neighborhood cells of a previous cell row and to some neighborhood cells of a subsequent cell row and to some neighborhood cells of the same cell row and characterized in that said method relative to an observed cell in each cell row further comprises the steps of:

computing a new data value in the observed cell which has at least one input from a cell in a previous cell row, comparing the new data value of the observed cell with the new data value of at least one adjacent neighbor row cell, updating the present data value of the observed cell to the new value if the new data value is the greater or lesser of the compared new value of at least one adjacent neighbor row cell, maintaining the present data value of the observed cell if the new data value is the same or not the greater or lesser of the compared new value of said at least one adjacent neighbor row cell, outputting the new data value of the observed cell to at least one cell in a subsequent cell row.

7. The method of claim 6 including the step of inhibiting any further change in the present value of the observed cell if the new data value is greater or smaller than a predetermined range of values.

* * * * *